US006479116B1

(12) United States Patent
Small, Jr. et al.

(10) Patent No.: US 6,479,116 B1
(45) Date of Patent: Nov. 12, 2002

(54) MULTI-LAYERED POLYMERIC STRUCTURES INCLUDING A LAYER OF ETHYLENE COPOLYMER

(75) Inventors: James Douglas Small, Jr., Kingsport, TN (US); Jeffrey James Vanderbilt, Longview, TX (US); Kathleen Diane Greer, Kingsport, TN (US); James Edward Rhein, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/389,174

(22) Filed: Sep. 2, 1999

Related U.S. Application Data

(60) Provisional application No. 60/099,648, filed on Sep. 9, 1998, now abandoned.

(51) Int. Cl.$^7$ .................. B32B 27/08; B32B 27/32; B32B 27/34; B32B 27/36
(52) U.S. Cl. ................ 428/36.7; 428/476.1; 428/475.8; 428/483
(58) Field of Search .................... 428/36.7, 476.1, 428/475.8, 483

(56) References Cited

U.S. PATENT DOCUMENTS

| | | | |
|---|---|---|---|
| 4,349,469 A | 9/1982 | Davis et al. | 524/765 |
| 4,643,926 A | 2/1987 | Mueller | 428/35 |
| 4,803,102 A | 2/1989 | Raniere et al. | 428/35.2 |
| 4,877,685 A | * 10/1989 | Bergstrom et al. | 428/500 |
| 4,910,085 A | 3/1990 | Raniere et al. | 428/412 |
| 4,939,009 A | 7/1990 | Beavers et al. | 428/35.2 |
| 4,948,643 A | 8/1990 | Mueller | 428/36.6 |
| 4,978,579 A | 12/1990 | Rosenbaum | 428/483 |
| 5,484,654 A | 1/1996 | Mueller | 428/332 |
| 5,486,387 A | 1/1996 | Mueller | 428/34.7 |
| 5,532,053 A | 7/1996 | Mueller | 428/287 |
| 5,681,627 A | 10/1997 | Mueller | 428/35.2 |
| 5,686,527 A | 11/1997 | Laurin et al. | 525/66 |
| 5,695,840 A | 12/1997 | Mueller et al. | 428/35.7 |
| 5,783,269 A | 7/1998 | Heilmann et al. | |
| 5,849,843 A | * 12/1998 | Laurin et al. | 525/66 |

FOREIGN PATENT DOCUMENTS

| | | |
|---|---|---|
| DE | 197 28 686 C1 | 4/1999 |
| EP | 0 738 589 A2 | 10/1996 |
| WO | WO 93/11926 A2 | 6/1993 |
| WO | WO 93/15908 A1 | 8/1993 |
| WO | WO 95/14739 A2 | 6/1995 |
| WO | WO 98/36905 A1 | 8/1998 |
| WO | WO 98/36905 * | 8/1998 |

OTHER PUBLICATIONS

Database WPI, Section Ch, Week 199706, Derwent Publications Ltd., London, GB; AN 1997–060840, JP 08 309939 A (Nippon Petrochemicals Co. Ltd), Nov. 26, 1996.
*Encyclopedia of Polymer Science and Engineering*, 2$^{nd}$ Edition, vol. 12, pp. 75–115, 1985 No Month.

* cited by examiner

*Primary Examiner*—Sandra M. Nolan
(74) *Attorney, Agent, or Firm*—Cheryl J. Tubach; Bernard J. Graves, Jr.

(57) ABSTRACT

There are provided multi-layered structures comprising at least one layer that is an ethylene/alpha-olefin copolymer having a density of less than 0.916 g/cc and a melting peak temperature of greater than 118° C. The multi-layered structures comprise at least three layers. Also provided are articles of manufacture produced from the multi-layered structures such as films, containers, pouches, packages, tubing and the like.

22 Claims, No Drawings

MULTI-LAYERED POLYMERIC STRUCTURES INCLUDING A LAYER OF ETHYLENE COPOLYMER

CROSS-REFERENCE TO RELATED APPLICATIONS

This application claims the benefit of priority under 35 U.S.C. 119 § (e) to United States Provisional Application Serial No. 60/099,648 filed Sept. 9, 1998, now abandoned.

FIELD OF THE INVENTION

The present invention relates to multi-layered structures that may be autoclavable and are particularly suitable for use as medical packaging. More particularly, structures such as the multi-layered films or sheets include an exterior layer comprising an ethylene copolymer having a density of less than 0.916 g/cc and a melting peak temperature greater than 118° C.

BACKGROUND OF THE INVENTION

Multi-layered structures are useful in forming packages, containers, or other articles for use in the medical and pharmaceutical industries. The structures may be in the form of films, sheets, tubing, profiles of different geometry, and the like, and are typically formed by coextrusion. Certain properties are desirable for such structures including clarity, toughness over a wide temperature range, retention of properties after autoclave sterilization, resistance to chemicals, and low water vapor transmission rates. Additionally, structures having flexibility and low seal initiation temperatures are particularly useful in producing packages and containers for parenteral solutions, plasma, drugs, nutrition products, and other medical and pharmaceutical products. Reference to such multi-layered structures is found in many patents, such as, for example, U.S. Pat. Nos. 4,643,926; 4,803,102; 4,939,009; 4,910,085; 4,948,643; 4,978,579; 5,484,654; 5,486,387; 5,532,053; 5,681,627; 5,686,527; 5,695,840; and others.

SUMMARY OF THE INVENTION

There are provided improved, multi-layered structures that may be autoclavable as defined by the test procedure herein, and are useful, particularly, for packaging, specifically medical packaging. The multi-layered structures comprise at least three (3) layers, one of which layers must be a first exterior layer comprising an ethylene/alpha-olefin copolymer, as defined hereinafter in more detail, characterized by having a density of less than 0.916 g/cc and a melting peak temperature greater than 118° C. In the multi-layered structures of the present invention, another of the requisite three layers must be a second exterior layer comprising a polyester or copolyester, a polyamide, or a polyolefin. The second exterior layer must be autoclavable as defined by the test procedure described herein. The multi-layered structures of the present invention further comprise at least one intermediate tie layer positioned between the first and/or second exterior layers and that provides adequate adhesion to prevent delamination or separation of the layers of the multi-layered structure. The tie layer comprises preferably an alpha-olefin/unsaturated monomer copolymer. More preferably, the alpha-olefin/unsaturated monomer copolymer has a melt flow rate greater than 0.25 g/10 min, more preferably 1.0–10 g/10 min and a melting peak temperature of at least 65° C., more preferably 65–150° C.

DETAILED DESCRIPTION OF THE INVENTION

There are provided improved, multi-layered structures that may be autoclavable as defined by the test procedure herein and are useful, particularly, for packaging, specifically medical packaging. The multi-layered structures comprise at least three (3) layers, one of which layers must be a first exterior layer comprising an ethylene/alpha-olefin copolymer, as defined hereinafter in more detail, characterized by having a density of less than 0.916 g/cc and a melting peak temperature greater than 118° C. In the multi-layered structures of the present invention, another of the requisite three layers must be a second exterior layer comprising a polyester or copolyester, a polyamide, or a polyolefin. The second exterior layer must be autoclavable as defined by the test procedure described herein. The multi-layered structures of the present invention further comprise at least one intermediate tie layer positioned between the first and/or second exterior layers and that provides adequate adhesion to prevent delamination or separation of the layers of the multi-layered structures. The tie layer comprises preferably an alpha-olefin/unsaturated monomer copolymer preferably having a melt flow rate greater than 0.25 g/10 min, more preferably 1.0–10 g/10 min and a melting peak temperature of at least 65° C., more preferably 65°–150° C.

Where the structure is a film or sheet, the multi-layered film or sheet of the invention can have a total thickness ranging from about 2 mils to about 50 mils. The preferred thickness of the film or sheet ranges from about 3 mils to about 20 mils, for packaging materials. The thickness of each of the layers of the multi-layer film or sheet can vary depending on the desired properties of the film or sheet.

Where it is desired that the multi-layered structures of the present invention be autoclavable, as determined by the test procedure herein, it is preferred that the second exterior layer comprising of a polyester or copolyester, polyamide, or polyolefin have a thickness of at least about 1 mil. In a further preferred embodiment, the second exterior layer comprises a copolyester having a thickness of at least about 1 mil.

The multi-layered structures of the present invention comprise a first exterior layer that comprises an ethylene/alpha-olefin copolymer having a density of less than 0.916 g/cc and a melting peak temperature greater than 118° C. It is preferred that the density of the ethylene/alpha-olefin copolymer range from about 0.86 to less than 0.916 g/cc. Moreover, it is preferred that the melting peak temperature of the ethylene/alpha-olefin copolymer range from greater than 118° C. to about 130° C., more preferably from about 121° C. to about 124° C.

The ethylene/alpha-olefin copolymer of the first exterior layer may be any interpolymer of ethylene, including copolymers, terpolymers, and the like, of ethylene and at least one or more other alpha-olefins wherein the ethylene content is at least about 50% by weight of the total monomers involved. The alpha-olefins, for example, may contain from 3 to 16 carbon atoms. Exemplary alpha-olefins that may be utilized herein are propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, and 5-vinyl-2-norbornene. In a preferred embodiment, the ethylene/alpha-olefin copolymer comprises from about 8 to about 30 weight percent of alpha-olefin, and, more preferably, from about 10 to about 15 weight percent of alpha-olefin based on the copolymer. Further, in a preferred embodiment, the alpha-olefin of the ethylene/alpha-olefin copolymer has from 3 to about 12 carbon atoms.

The at least one or more intermediate tie layer(s) of the multi-layered structures is positioned between, and adheres to, the first exterior layer and/or the second exterior layer. The tie layer(s) provides adequate adhesion to prevent delamination or separation of the layers of the multi-layered structures, especially during autoclaving conditions. In addition, certain of the intermediate layers may provide enhanced gas or moisture barrier properties. The tie layer(s) is preferably an alpha-olefin/unsaturated monomer copolymer having a melt flow rate of greater than 0.25 g/10 min, preferably 1.0 to 10 g/10 min, and a melting peak temperature of at least 65° C. preferably 65–150° C. In a preferred embodiment, the alpha-olefin/unsaturated monomer copolymer comprises from about 0.1 to about 30 weight percent of at least one, or more, unsaturated monomer(s), based upon the weight of the copolymer, that is copolymerizable with the alpha-olefin component of the copolymer. Any alpha-olefin and/or any unsaturated monomer copolymerizable therewith may be used in preparing the copolymer to be used as the tie layer. Also suitable for use herein as a tie layer is an ethylene-vinyl alcohol copolymer and/or an ethylene-vinyl alcohol interpolymer.

Suitable for use in preparing the alpha-olefin/unsaturated monomer copolymer to be used as a tie layer herein are alpha-olefins that contain from 2 to 16 carbon atoms. Exemplary alpha-olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene. Preferred for use is ethylene. Suitable for use herein as the unsaturated monomer component of the copolymer are maleic acid, fumaric acid, acrylic acid, methacrylic acid, vinyl acetate, acrylonitrile, methacrylonitrile, butadiene, carbon monoxide, acrylic esters, maleic anhydride, and the like. Preferred for use herein as the unsaturated monomer are acrylic esters, maleic anhydride, vinyl acetate, or methacrylic acid.

The multi-layered structures of the present invention comprise a second exterior layer. The second exterior layer comprises a polyester or copolyester, a polyamide, or a polyolefin described further as follows.

Suitable for use herein are polyesters or copolyesters produced from the reaction of one or more diacids with one or more glycols. Preferred copolyesters are polyesterether block copolymers comprised of an aromatic or aliphatic dicarboxylic acid, or preferably the dimethyl ester thereof, an alkylene glycol, and a low molecular weight poly (alkylene glycol ether). Examples of such polyesterethers are described in the Encyclopedia of Polymer Science and Engineering, $2^{nd}$ Edition, Volume 12, pages 75–115, 1985.

Examples of acids suitable for producing such polyesterethers include, but are not limited to, terephthalic acid, isophthalic acid, and 1,4-cylohexane-dicarboxylic acid. Examples of suitable alkylene glycols (or alkane diols) useful in producing such polyesterethers include, but are not limited to, ethylene glycol, propylene glycol, with 1,3-propylene glycol being preferred, 1,4-butanediol, hexanediol, and 1,4-cyclohexanedimethanol. Examples of suitable poly(alkylene glycol ethers) include, but are not limited to, poly(ethylene oxide), poly(propylene oxide), poly(tetramethylene oxide), and copolymers thereof.

Polyamides used herein are polymers that contain recurring amide groups as parts of the main polymer chain. Examples are polyamides formed by condensation, addition, or ring-opening polymerization methods.

Examples of preferred polyamides are as follows. Nylon-6 which is typically produced by the hydrolytic bulk polymerization of caprolactam. Nylon-6,6 which is typically manufactured via a condensation reaction of hexamethylenediamine and adipic acid. Nylon-6,9 which is the condensation reaction product of hexamethylenediamine and azelaic acid. Nylon-6,12 which is also a condensation reaction product of hexamethylenediamine and dodecanedioic acid. Nylon-11 which is condensed from 11-aminoundecanoic acid, and Nylon-12 which is produced by the hydrolytic bulk polymerization of laurolactam. There are other known polyamides which also may be used herein.

Exemplary of polyolefins are:
1. Ethylene-based polymers such as:
   A) Ethylene homopolymers including high density polyethylene (HDPE) and low density polyethylene (LDPE)
   B) Ethylene interpolymers including copolymers, terpolymers, and the like, of ethylene and at least one or more other olefins wherein the ethylene content is at least about 50% by weight of the total monomers involved. Preferably the olefins are alpha-olefins or cyclic olefins. The olefins, for example, may contain from 3 to 16 carbon atoms. Exemplary olefins that may be utilized herein are propylene, 1-butene, 1-pentene, 1-hexene, 1-heptene, 1-octene, 4-methylpent-1-ene, 1-decene, 1-dodecene, 1-hexadecene, cyclopentene, cyclohexene, norbornene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of ethylene/olefin interpolymers containing long chain branching may occur.
   C) Ethylene-vinyl aromatic interpolymers Including ethylene-styrene interpolymers
   D) Copolymers of ethylene with vinyl acetate, methyl acrylate, butyl acrylate, methyl methacrylate, ethyl methacrylate, carbon monoxide.
2. Isotactic Propylene-based polymers:
   A) Polypropylene homopolymer
   B) Propylene-based interpolymers including copolymers, terpolymers, and the like, of propylene and at least one or more other olefins wherein the propylene content is at least about 50% by weight of the total monomers involved. Preferably the olefins are alpha-olefins. The olefins, for example, may contain from 2 to 16 carbon atoms. Exemplary olefins that may be utilized herein are ethylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of propylene/olefin interpolymers containing long chain branching may occur.
3. Syndiotactic propylene-based polymer such as:
   A) Polypropylene homopolymer
   B) Propylene-based interpolymers including copolymers, terpolymers, and the like, of propylene and at least one or more other olefins wherein the propylene content is at least about 50% by weight of the total monomers involved. Preferably the olefins are alpha-olefins. The olefins, for example, may contain from 2 to 16 carbon atoms. Exemplary olefins that may be utilized herein are ethylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of propylene/olefin interpolymers containing long chain branching may occur.

4. Cyclic-olefin based polymers such as:
   A) Polymers based on monocyclic olefins having 4 to about 16 carbon atoms including: cyclobutene, cyclopentene, cyclohexene, cycloheptene, cyclooctene.
   B) Monocyclic-olefin-based interpolymers including copolymers, terpolymers, and the like, of monocyclic olefin and at least one or more other olefins wherein the monocyclic olefin content is at least about 50% by weight of the total monomers involved. Preferably the olefins are alpha-olefins. The olefins, for example, may contain from 2 to 16 carbon atoms. Exemplary olefins that may be utilized herein are ethylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of propylene/olefin interpolymers containing long chain branching may occur and.
   C) Polymers based on multiple cyclic structures including bicyclic and tricyclic and fused ring systems such as norbornene,
   D) Multiplecyclic olefin based interpolymers including copolymers, terpolymers, and the like, of multiplecyclic olefin and at least one or more other olefins wherein the multiplecyclic olefin content is at least about 50% by weight of the total monomers involved. Preferably the olefins are alpha-olefins. The olefins, for example, may contain from 2 to 16 carbon atoms. Exemplary olefins that may be utilized herein are ethylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of multiplecyclic olefin /olefin interpolymers containing long chain branching may occur involved 5 Polymers based on 4-methyl-1-pentene such as:
   A) Poly 4-methyl-1-pentene
   B) Poly 4-methyl-1-pentene interpolymers including copolymers, terpolymers, and the like, of 4-methyl-1-pentene and at least one or more other olefins wherein the 4-methyl-l-pentene content is at least about 50% by weight of the total monomers involved. Preferably the olefins are alpha-olefins. The olefins, for example, may contain from 3 to 16 carbon atoms. Exemplary olefins that may be utilized herein are ethylene, propylene, 1-butene, 1-pentene, 1-hexene, 1-heptene, 1-octene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene, 5-vinyl-2-norbornene, and olefins formed in situ in the polymerization medium. When olefins are formed in situ in the polymerization medium, the formation of 4-methyl-1-pentene/olefin interpolymers containing long chain branching may occur.

In preparing the multi-layered structures of the present invention, the first exterior layer comprising an ethylene/alpha-olefin copolymer having a density less than 0.916 g/cc and a melting peak temperature greater than 118° C., may also contain a radio frequency (RF) susceptible polymer. The presence of the RF susceptible polymer renders the first exterior layer sealable to another substrate by use of radio frequencies greater than about 5 MHz. Any RF susceptible polymer may be utilized herein. In so doing, amounts of from about 5 to about 50 weight percent of the RF susceptible polymer may be blended with from about 50 to about 95 weight percent of the ethylene/alpha-olefin copolymer comprising the first exterior layer.

Examples of RF susceptible polymers include, but are not limited to, ethylene copolymers having 50 to 85 percent ethylene content with comonomers selected from the group consisting of acrylic acid, methacrylic acid, ester derivatives of acrylic acid with alcohols having 1 to 10 carbons, ester derivatives of methacrylic acid with alcohols having 1 to 10 carbons and vinyl acetate.

If desired, additional layers may be added to the multi-layered structures described herein to impart additional or improved properties to the structures or to adapt the structures to other uses. The number of layers required for any structure will be usually determined by the end use.

Conventional additives may be incorporated into any or all of the layers of the multi-layered structures of the present invention. Such additives include antiblocking agents, antioxidants, processing aids, pigments, antistatic agents, heat stabilizers, lubricants, dispersants, foaming agents, plasticizers, flame retardants, crosslinking agents, ultraviolet light absorbers, light stabilizers, weathering stabilizers, slip agents, antifogging agents, dyes, and the like.

The multi-layered structures of the present invention may be formed utilizing any method known in the art. For example, multi-layered films or sheets may be formed by cast coextrusion using conventional techniques. The film or sheet may also be formed utilizing a hot blown process, particularly for thin films. Other processes that are available for forming the multi-layered films or sheets include extrusion coating and conventional lamination. Multi-layered structures other than films or sheets may be formed utilizing any method known in the art, including profile extrusion, molding, thermoforming, or lamination.

Articles of manufacture may be produced from the multi-layered structures of the present invention utilizing any conventional techniques. Such articles include containers, pouches and packages for medical purposes, and tubing, among others.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. All patents referred to herein are incorporated by reference in their entirety.

EXAMPLES

In the following examples the test procedures listed below were used in evaluating the analytical properties of the polymeric materials herein and in evaluating the physical properties of the films of the examples.

a) Density is determined according to ASTM D 883 from a plaque made according to ASTM D1928.

b) Melt Index (MI) is determined in accord with ASTM D1238, condition E, measured at 190° C., and reported as grams per 10 minutes;

c) Melting Peak Temperature ($T_m$) was determined in accordance with ASTM D3418-97 using a Differential Scanning Calorimeter (DSC). The $T_m$ values are not true equilibrium melting points but are DSC peak temperatures of the melt transition recorded on the second heat cycle. In each case, approximately 10 mg of polymer sample was placed in an aluminum sample pan and the sample lid was crimped in place. The sample was then heated to 160° C. at a rate of 50° C./minute and held at 160° C. for 10 minutes. The sample was then cooled to −30° C. at a rate of 10° C./minute while recording the freezing or crystallization curve. After holding for 2 minutes at −30° C., the second heat cycle was initiated and the sample was heated at a rate of 10° C./minute to a final temperature of 160° C. while recording the heating curve. The melting peak temperature, $T_m$, was obtained from the melt transition on the heating curve of the second heat cycle.

d) Autoclavability—specimens were prepared 1 inch wide by 4 inches long (machine direction). A line was drawn 0.5 inches from each end of the strip with a permanent marker providing a 3-inch test length. A static weight of approximately 100 grams was connected to one end of the specimen at the drawn line. A clip was attached to the other end at the drawn line and the specimens with the 100 gram static weight were hung in a Pelton & Crane model Delta 10 autoclave. The specimens were sterilized for one hour at 121° C. After cooling, samples were removed and measured to determine change in length. This test was conducted 3 times for each specimen and the results reported are an average. For purposes of this test procedure, a structure is considered to be autoclavable if the change in length is less than 60%.

EXAMPLE 1

In Example 1 there was prepared by coextrusion a three layered film comprising a first exterior layer of an ethylene-alpha-olefin copolymer, an intermediate alpha-olefin/unsaturated monomer copolymer tie layer and a second exterior layer of a copolyester, all of which are further defined herein. The material used in forming the first exterior layer of the three layer film structure was MXSTEN CM27057-F ethylene-hexene copolymer having a density of 0.910 g/cc and a melting peak temperature of 124° C., a trademarked product commercially available from Eastman Chemical Company, Kingsport Tenn. The ethylene-hexene copolymer was extruded through a 3.5 inch Davis Standard, 24:1 L/D (length/diameter) single screw extruder with set temperatures on the extruder barrel of 510°–570° F. and adapter of 550° F. The material used in forming the intermediate tie layer of the structure was ADMER SE800 adhesive polyolefin, polyethylene based, modified with functional groups, a trademarked product commercially available from Mitsui Chemicals, Inc., Tokyo, Japan. The tie layer material was extruded through a 1.0 inch Killion, 24:1 L/D single screw extruder with set temperatures on the extruder barrel and adapter of 500° F. The material used in forming the second exterior layer of the three layered structure was ECDEL 9966 copolyester based on 1,4-cyclohexanedicarboxylic acid, 1,4-cyclohexanedimethanol, and poly (oxytetramethylene) glycol, a trademarked product available commercially from Eastman Chemical Company. The copolyester was extruded through a 1.25 inch Killion 24:1 L/D single screw extruder with set temperatures on the extruder barrel of 450°–400° F. and adapter of 360° F. The materials met and passed through a Production Components Masterflow II Three-Layer Co-Extrusion Block followed by a 30 inch Extrusion Dies, Inc., Ultraflex U40 die, 1 inch land length with 40 mils die opening with die temperatures set at 500° F. to provide a film. The film had a total thickness of about 7.8 mils, the first exterior layer having about 5.7 mils thickness, the tie layer having about 0.7 mils thickness, and the second exterior layer having about 1.4 mils thickness. The results obtained from testing of the film are reported in Tables I and II.

EXAMPLE 2

In Example 2, a three layered film was produced by coextrusion. The material used in forming the first exterior layer was the MXSTEN CM27057-F ethylene-hexene copolymer described in Example 1. The ethylene-hexene copolymer was extruded through a 2.0 inch Davis Standard, 30:1 L/D single screw extruder with set temperatures on the extruder barrel of 500° F. and adapter of 530° F. The material used in forming the intermediate layer, or tie layer, of the structure was the ADMER SE800 polymeric material described in Example 1. This material was extruded through a 1.0 inch Killion, 24:1 L/D single screw extruder with set temperatures on the extruder barrel of 500° F. and adapter of 510° F. The material used in forming the second exterior layer was ULTRAMID B3 nylon-6, a trademarked product available commercially from BASF Corporation. The nylon-6 was extruded through a 1.25 inch Killion 24:1 L/D single screw extruder with set temperatures on the extruder barrel and adapter of 500° F. The materials met and passed through a Production Components Masterflow II Three-Layer Co-Extrusion Block followed by a 30 inch Extrusion Dies, Inc., Ultraflex U40 die, 1 inch land length with 40 mils die opening with die temperatures set at 530° F. to provide a film. The film had a total thickness of about 7.8 mils, the first exterior layer having about 6.0 mils thickness, the tie layer having about 1.0 mils thickness, and the second exterior layer having about 0.8 mils thickness. The results obtained from testing of the film are reported in Table I.

EXAMPLE 3

In Example 3, a three layered film was produced by coextrusion. The material used in forming the first exterior layer was ATTANE 4201 ethylene-octene copolymer having a density of 0.912 g/cc and a melting-peak temperature of 122° C., a trademarked product commercially available from Dow Chemical Company. The ethylene-octene copolymer was extruded through a 2.0 inch Davis Standard, 30:1 L/D single screw extruder with set temperatures on the extruder barrel and adapter of 500° F. The material used in forming the intermediate layer, or tie layer, of the structure was the ADMER SE800 polymeric material described in Example 1. The tie layer material was extruded through a 1.0 inch Killion, 24:1 L/D single screw extruder with set temperatures on the extruder barrel of 500° F. and adapter of 510°F. The material used in forming the second exterior layer was the ECDEL 9966 copolyester, described in Example 1. The copolyester was extruded through a 1.25 inch Killion 24:1 L/D single screw extruder with set temperatures on the extruder barrel of 500° F. and adapter of 400° F. The materials met and passed through a Production Components Masterflow II Three-Layer Co-Extrusion Block followed by a 30 inch Extrusion Dies Inc., Ultraflex U40 die, 1 inch land length with 40 mils die opening with die temperatures set at 500° F. to provide a film. The film had a total thickness of about 8.4 mils, the first exterior layer having about 6.8 mils thickness, the tie layer having about 0.9 mils thickness, and the second exterior layer having about 0.7 mils thickness. The results obtained from testing of the film are reported in Table I.

EXAMPLE 4

In Example 4, a three layered film was produced by coextrusion. The material used in forming the first exterior layer was MXSTEN CV77501-X ethylene-hexene copolymer having a density of 0.910 g/cc and a melting peak temperature of 121° C., a trademarked product available commercially from Eastman Chemical Company. The ethylene-hexene copolymer was extruded through a 3.5 inch Davis Standard, 24:1 L/D single screw extruder with set temperatures on the extruder barrel of 500–530° F. and adapter of 530° F. The material used in forming the intermediate layer, or tie layer, of the structure was the ADMER SE800 polymeric material described in Example 1. This tie layer material was extruded through a 1.0 inch Killion, 24:1 L/D single screw extruder with set temperatures on the extruder barrel and adapter of 500° F. The material used in forming the second exterior layer was the ECDEL 9966 copolyester described in Example 1. This copolyester material was extruded through a 1.25 inch Killion 24:1 L/D single screw extruder with set temperatures on the extruder barrel of 430–400° F. and adapter of 360° F. The materials met and passed through a Production Components Masterflow II Three-Layer Co-Extrusion Block followed by a 30 inch Extrusion Dies, Inc., Ultraflex U40 die, 1 inch land length with 40 mils die opening with die temperatures set at 500° F. to provide a film. The thicknesses of the layers of the multi-layer film were estimated to be approximately a first exterior layer of 6.2 mils, an intermediate tie layer of 0.46 mil and a second exterior layer of 0.9 mil. The results obtained from testing of the multi-layered film are reported in Table 1.

TABLE I

AUTOCLAVABILITY

| Film of Example | % Stretch After Sterilization |
|---|---|
| 1 | 17 |
| 2 | 8 |
| 3 | 42 |
| 4 | 20 |

TABLE II

PROPERTIES FOR FILM OF EXAMPLE 1

| Property | Test Method | |
|---|---|---|
| PPT Tear Strength, MD (N) | ASTM D 2582 | 115.6 |
| Tensile Strength @ Break, MD (MPa) | ASTM D 882 | 21.5 |
| Elongation @ Break, MD (%) | ASTM D 882 | 891 |
| Tensile Modulus, 1% Secant, MD (MPa) | ASTM D 882 | 156.7 |
| Dart Impact Strength, 23° C. (g) | ASTM D 1709 | No Break |

From the above data, it is apparent that the films of Examples 1, 2, 3 and 4 are autoclavable. Moreover, the data for Example 1 indicates that the multi-layered film has a useful range of properties.

The films of Examples 1–4 after sterilization were visually inspected for clarity and delamination of layers. It was observed that the films were clear and there was no evidence of delamination.

EXAMPLE 5

The procedure of Example 1 is followed with the exception that the second exterior layer is formed from polypropylene homopolymer rather than from the ECDEL 9966 copolyester described therein. There is expected to be obtained a satisfactory multi-layered film.

It should be clearly understood that the forms of the invention herein described are illustrative only and are not intended to limit the scope of the invention. The present invention includes all modifications falling within the scope of the following claims:

We claim:
1. A multi-layered structure comprising:
   a) a first exterior layer comprising an ethylene/alpha-olefin copolymer having a density of less than 0.916 g/cc and a melting peak temperature of greater than 118° C.;
   b) a second exterior layer comprising a polymeric material selected from the group consisting of polyesters, copolyesters, polyamides and polyolefins, that is autoclavable as defined by the test procedure herein wherein film specimens were prepared 1 inch wide by 4 inches long (machine direction); a line was drawn 0.5 inch from each end of the film specimen providing a 3-inch test length; a static weight of approximately 100 gram was connected to one end of the specimen at the drawn line; a clip was attached to the other end at the drawn line, and the specimen (with the 100 gram static weight) was hung in a Pelton & Crane model Delta 10 autoclave; the specimens were sterilized for one hour at 121° C.; after cooling; the specimens were removed and measured to determine change in length; the test was conducted 3 times for each specimen, and the results reported are an average; a structure is considered to be autoclavable if the change in length is less than 60%; and
   c) at least one layer that is positioned between the first exterior layer and the second exterior layer and that provides adequate adhesion to prevent delamination or separation of the layers of the multilayered structure.
2. The multi-layered structure according to claim 1 wherein the ethylene/alpha-olefin copolymer has a density ranging from about 0.86 to less than 0.916 g/cc, and a melting peak temperature ranging from greater than 118° C. to about 130° C.

3. The multi-layered structure according to claim 2 wherein the ethylene/alpha-olefin copolymer has a melting peak temperature ranging from about 121° C. to about 124° C.

4. The multi-layered structure according to claim 1 wherein the at least one layer that is positioned between the first and second exterior layers comprises an alpha-olefin/unsaturated monomer copolymer.

5. The multi-layered structure according to claim 4 wherein the alpha-olefin/unsaturated monomer copolymer has a melt flow rate greater than 0.25 g/10 min and a melting peak temperature of at least 65° C.

6. The multi-layered structure according to claim 4 wherein the alpha-olefin/unsaturated monomer copolymer is an ethylene/unsaturated monomer copolymer.

7. The multi-layered structure according to claim 1 wherein the at least one layer that provides adequate adhesion to prevent delamination or separation of the layers is an ethylene-vinyl alcohol copolymer.

8. The multi-layered structure according to claim 1 wherein the ethylene/alpha-olefin copolymer is an ethylene/hexene copolymer.

9. The multi-layered structure according to claim 1 wherein the polymeric material in the second exterior layer is selected from the group consisting of polyesters and copolyesters.

10. The multi-layered structure according to claim 1 wherein the first exterior layer further comprises a radio frequency susceptible polymer.

11. The multi-layered structure according to claim 1 wherein the ethylene/alpha-olefin copolymer is an ethylene/octene copolymer.

12. The multi-layered structure according to claim 1 wherein the first exterior layer is ethylene-hexene copolymer and the second exterior layer is a copolyester.

13. The multi-layered structure according to claim 1 wherein the first exterior layer is ethylene-octene copolymer and the second exterior layer is a copolyester.

14. The multi-layered structure according to claim 1 wherein the first exterior layer is ethylene-hexene copolymer and the second exterior layer is a polyamide.

15. The multi-layered structure according to claim 1 wherein the first exterior layer is ethylene-hexene copolymer and the second exterior layer is a polyolefin.

16. An article fabricated from the multi-layered structure according to claim 1.

17. The article according to claim 16 wherein the article is a multi-layered film or sheet.

18. The article according to claim 16 wherein the article is a container.

19. The article according to claim 16 wherein the article is a pouch.

20. The article according to claim 16 wherein the article is a package.

21. The article according to claim 16 wherein the article is a tubing.

22. The article according to claim 16 wherein the article is an extruded profile.

* * * * *